US012754958B1

(12) United States Patent
Ben Shoham et al.

(10) Patent No.: US 12,754,958 B1
(45) Date of Patent: Oct. 6, 2026

(54) TEMPLATE GUIDED SPECULATIVE DECODING

(71) Applicant: INTUIT INC., Mountain View, CA (US)

(72) Inventors: Ofir Ben Shoham, Giv'atayim (IL); Natalie Bar Eliyahu, Azur (IL); Shon Mendelson, Tel Aviv (IL); Sagiv Antebi, Tel Aviv (IL); Shai Ardazi, Petah Tikva (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/547,249

(22) Filed: Feb. 23, 2026

(51) Int. Cl.
*G06F 16/903* (2019.01)

(52) U.S. Cl.
CPC .............................. *G06F 16/90335* (2019.01)

(58) Field of Classification Search
CPC ................................................ G06F 16/90335
See application file for complete search history.

(56) References Cited

U.S. PATENT DOCUMENTS

2025/0053735 A1* 2/2025 Shevchenko ........... G06F 40/30
2025/0078648 A1* 3/2025 Ramanasankaran ... G05B 15/02
2025/0251932 A1* 8/2025 Hensley .................. G06F 8/427
2025/0363353 A1* 11/2025 Zhong ...................... G06N 3/08
2025/0371276 A1* 12/2025 Yim ......................... G06F 40/30
2026/0099683 A1* 4/2026 Lee ......................... G06F 40/40

OTHER PUBLICATIONS

Priya, Feb. 11, 2026, "The Machine Learning Practitioner's Guide to Speculative Decoding", https://machinelearningmastery.com/the-machine-learning-practitioners-guide-to-speculative-decoding/.*
Zhou et al. "Large Language Model (LLM) for Telecommunications: A Comprehensive Survey on Principles, Key Techniques, and Opportunities", 2024 (Year: 2024).*

* cited by examiner

*Primary Examiner* — Matthew J Ellis
(74) *Attorney, Agent, or Firm* — Patterson + Sheridan, LLP

(57) ABSTRACT

Aspects of the present disclosure involve accelerated machine learning based sequence generation. Aspects include generating a first portion of a sequence based on an input query using a speculative decoding process involving a draft machine learning model and a target machine learning model with a larger number of parameters than the draft model. Aspects include determining, based on the input query and the first portion, that a next portion of the sequence is predicted to correspond to a template. Aspects include, based on the determining, generating the next portion of the sequence, without using the draft machine learning model, through a template-based generative process involving one or more rules or a generative machine learning model having fewer parameters than the draft machine learning model. Aspects include verifying the next portion using the target machine learning model and appending the next portion to the sequence based on the verifying.

17 Claims, 5 Drawing Sheets

TEMPLATE GUIDED SPECULATIVE DECODING

INTRODUCTION

Aspects of the present disclosure relate to systems and methods that accelerate generation of token sequences by dynamically selecting between a lightweight template-based multi-token generation process and draft-based token-by-token decoding using a decision mechanism operating on generation context, thereby reducing compute and latency while preserving output fidelity through verification by a target model.

BACKGROUND

Language processing machine learning models, such as large language models (LLMs) typically generate sequences by predicting one token at a time conditioned on previously produced tokens. This autoregressive process typically requires a forward pass through the model for each new token, resulting in substantial latency and computational cost, particularly for long outputs or interactive applications that demand near real-time responses. To mitigate delay, some systems employ smaller auxiliary models to draft candidate continuations for subsequent verification by a larger model. However, the drafting itself often proceeds token by token and can still be resource-intensive and time-consuming, particularly when many tokens are required.

Conventional decoding pipelines often expend compute uniformly across a variety of different types of content (e.g., regardless of whether such content is repetitive or predictable), offering limited differentiation based on the nature of the upcoming content. Moreover, verification by a larger model of each individual token introduces additional overhead that must be balanced against throughput goals and resource constraints. In applications or environments with strict latency budgets, such as interactive assistants, code completion tools, or enterprise workflows that render structured responses, the cumulative cost of repeated forward passes across both drafting and verification can impede usability and scale. There remains a need for approaches that reduce inference cost and latency while maintaining the fidelity of generated outputs.

BRIEF SUMMARY

According to an aspect of the present disclosure, a method for accelerated machine learning based sequence generation is provided. The method may include: generating a first portion of a sequence based on an input query using a speculative decoding process involving a draft machine learning model and a target machine learning model that has a larger number of parameters than the draft machine learning model; determining, by a decision mechanism operating on the input query and the first portion, that a next portion of the sequence is predicted to correspond to a template; based on the determining that the next portion is predicted to correspond to the template, generating the next portion of the sequence, without using the draft machine learning model, through a template-based generative process involving one or more rules or a generative machine learning model having fewer parameters than the draft machine learning model; verifying the next portion using the target machine learning model; and appending the next portion to the sequence based on the verifying.

According to other aspects, a non-transitory computer readable medium may store instructions that, when executed by one or more processors of a computing system, cause the computing system to perform one or more of the methods set forth above. According to other aspects, a system includes one or more processors and a memory storing instructions that, when executed by the one or more processors, cause the system to perform aspects of one or more of the methods set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
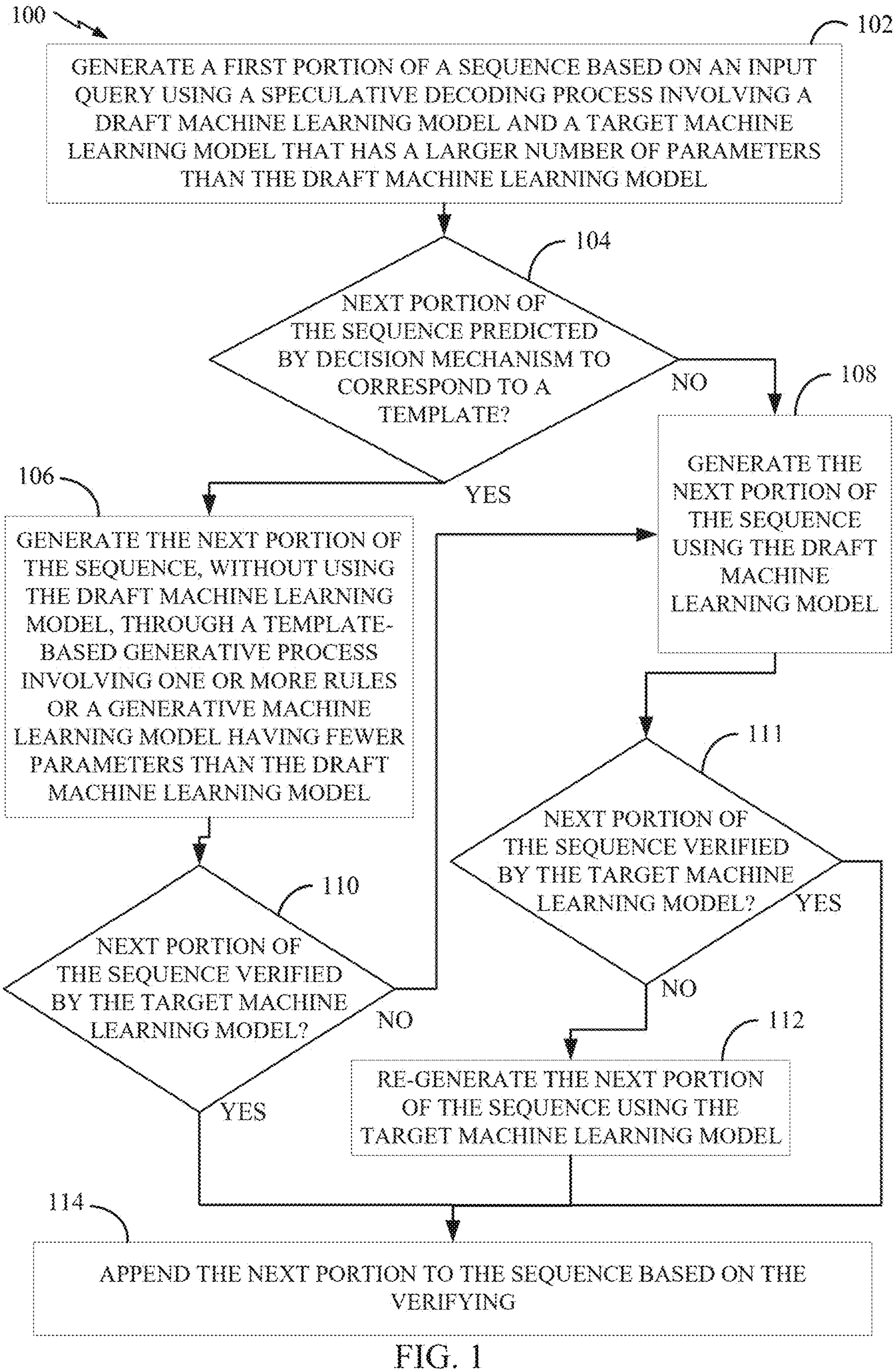
FIG. 1 illustrates a block diagram of an example workflow for accelerated machine learning based sequence generation, according to aspects of the present disclosure.

The present disclosure relates to a method and system for accelerated machine learning based sequence generation. For example, techniques described herein introduce a decoding architecture that accelerates sequence generation by dynamically choosing, at each step, between two complementary paths: a lightweight template-based generation path that produces multiple tokens in one shot and a conventional draft path that generates tokens iteratively using a draft machine learning model. A decision mechanism evaluates the current generation context, including the user prompt and the already produced text, to predict whether the next portion is likely to follow a recognizable template. If so, the system bypasses token-by-token drafting and generates a multi-token candidate segment using either deterministic rules or a smaller, specialized generative model. The candidate segment is then verified by a larger target model, which accepts or rejects the segment in a single operation.

Techniques described herein accomplish a technical improvement over prior techniques by dynamically reducing the number of forward passes required to produce predictable segments of text. Conventional speculative decoding still expends token-level compute in the draft stage before target verification. In contrast, the template path compresses what would otherwise be many draft invocations into a single lightweight generation operation, followed by single-shot verification. This reduction in calls lowers latency and compute, particularly for segments that exhibit fixed structure such as programming scaffolding, JavaScript Object Notation (JSON) headers, tabular column names, common conversational phrases, and/or the like.

A key component is the decision mechanism that differentiates between predictable and variable content. The mechanism may be implemented as a lightweight binary classifier (e.g., that may be encoder-based) or as rules that operate on the generation context. In certain aspects, classifier training uses an automated labeling pipeline that generates both template and draft continuations for large corpora, compares their log-probabilities under the target model, and labels the preferred path. This strategy avoids inefficient manual tagging and yields robust path selection tuned to the target model's preferences.

When the target model rejects a template-based candidate portion of a sequence, the system may fall back seamlessly to the draft path and continue with conventional speculative decoding. This verification-and-fallback loop preserves output fidelity while still realizing performance gains when templates apply. Because verification occurs once per generated segment rather than once per token, the approach reduces the resource overhead associated with repeated target checks without compromising acceptance criteria.

The disclosed techniques integrate into standard client-server environments and support interactive and batch generation. By directing heavier compute only to the portions of text that warrant it and substituting lightweight template-based generation where appropriate, the system improves throughput, reduces end-to-end latency, and lowers resource consumption. These improvements are achieved without sacrificing accuracy, as the target model remains the arbiter of acceptance, and without constraining output diversity, as the draft path continues to handle non-templated content.

Example Workflow for Accelerated Machine Learning Based Sequence Generation

FIG. 1 illustrates a block diagram 100 depicting an example workflow related to accelerated machine learning based sequence generation. The workflow may, for example, be performed by one or more computing components running on one or more computing devices, such as server 210 of FIG. 2 and/or system 500B of FIG. 5B, described below.

The workflow may begin at step 102, with generating a first portion of a sequence in response to an input query using a speculative decoding process involving a draft machine learning model and a target machine learning model. The target machine learning model may have more parameters than the draft model, and generally serves as the arbiter of acceptance for tokens or segments generated using the draft machine learning model (or using template-based generative techniques described herein). It is noted that the speculative decoding process may involve using the draft machine learning model to generate the first portion of the sequence and using the target machine learning model to verify the first portion and/or may involve bypassing use of the draft machine learning model in favor of template-based generative techniques for generating the first portion and using the target machine learning model to verify the first portion.

Following production of the first portion, a decision mechanism may evaluate the current generation context, which includes at least the input query and the previously generated tokens (e.g., the first portion). The decision mechanism may be implemented as a lightweight encoder-based binary classifier and/or a rules engine, and is generally configured to determine whether the next portion of the sequence is predicted to correspond to a recognizable template. The classifier may be trained using automatically labeled data obtained by running both template and draft continuations over large corpora and comparing log-probabilities under the target model to infer a preferred path, thereby avoiding manual tagging. A rules engine may apply rules to look for patterns in the generation context that are known to be associated with particular templates. Such rules may include exact and/or fuzzy keyword searches, regular expressions, searches for patterns or repetitions, and/or the like.

When the decision mechanism predicts that the next portion corresponds to a template (e.g., resulting in a "YES" outcome for decision step 104), the workflow transitions to a template-based generative process at step 106 that generates a candidate portion (e.g., which may include multiple tokens generated in a single operation) without invoking the draft model. The template-based generative process may involve the use of rules and/or the use of a specialized generative model that has fewer parameters than the draft model and, in some aspects, is fine-tuned or prompt-tuned for template-based synthesis. Example templates include programming language scaffolding such as Python function headers beginning with "def," repeated tabular column headers, structured data fragments such as JSON key sequences, and/or the like.

A rule-based generative process may involve generating one or more tokens that are expected to be next in the sequence according to a template determined to be applicable. An example generative model may be trained (and/or prompted) to output one or more tokens based on an input generation context and, in some aspects, an input template or template identifier. The generated candidate portion (e.g., the next portion) may comprise a block of m tokens, where m may be chosen according to system configuration, heuristics tied to the detected template type, and/or the like.

The candidate next portion produced by the template path (at step 106) is submitted to the target machine learning model for single-shot verification. If the target model accepts the candidate next portion (resulting in a "YES" determination at decision step 110), the system appends the candidate next portion to the sequence at step 114 and, in some aspects, returns to the decision mechanism at decision step 104 to evaluate whether the subsequent next portion is predicted to correspond to a template.

If the target model rejects the segment (resulting in a "NO" determination at decision step 110), the workflow falls back to the draft path, where, at step 108, one or more tokens for the next portion are generated (e.g., token-by-token) by the draft machine learning model and evaluated by the target machine learning model according to conventional speculative decoding. Also, when the decision mechanism predicts that the next portion does not correspond to a template (resulting in a "NO" determination back at decision step 104), the workflow continues on the draft path at step 108 and generates the next portion (e.g., token-by-token) with speculative decoding.

In some aspects, if the target model rejects the candidate portion generated by the draft model (resulting in a "NO determination at decision step 111), the target model may regenerate the next portion at step 112, after which the regenerated next portion may be appended to the sequence at step 114.

The decision mechanism may be invoked iteratively after each accepted addition to the sequence, enabling dynamic routing between the template and draft paths throughout generation.

By generating predictable segments in a lightweight template-based operation (in some cases generating multiple tokens in a single operation) and verifying such segments once, the workflow depicted in FIG. 1 reduces the number of forward passes through the draft model that would otherwise be expended on token-by-token drafting, thereby decreasing latency and compute cost while preserving output fidelity through target-model verification and seamless fallback.

Figure 2:
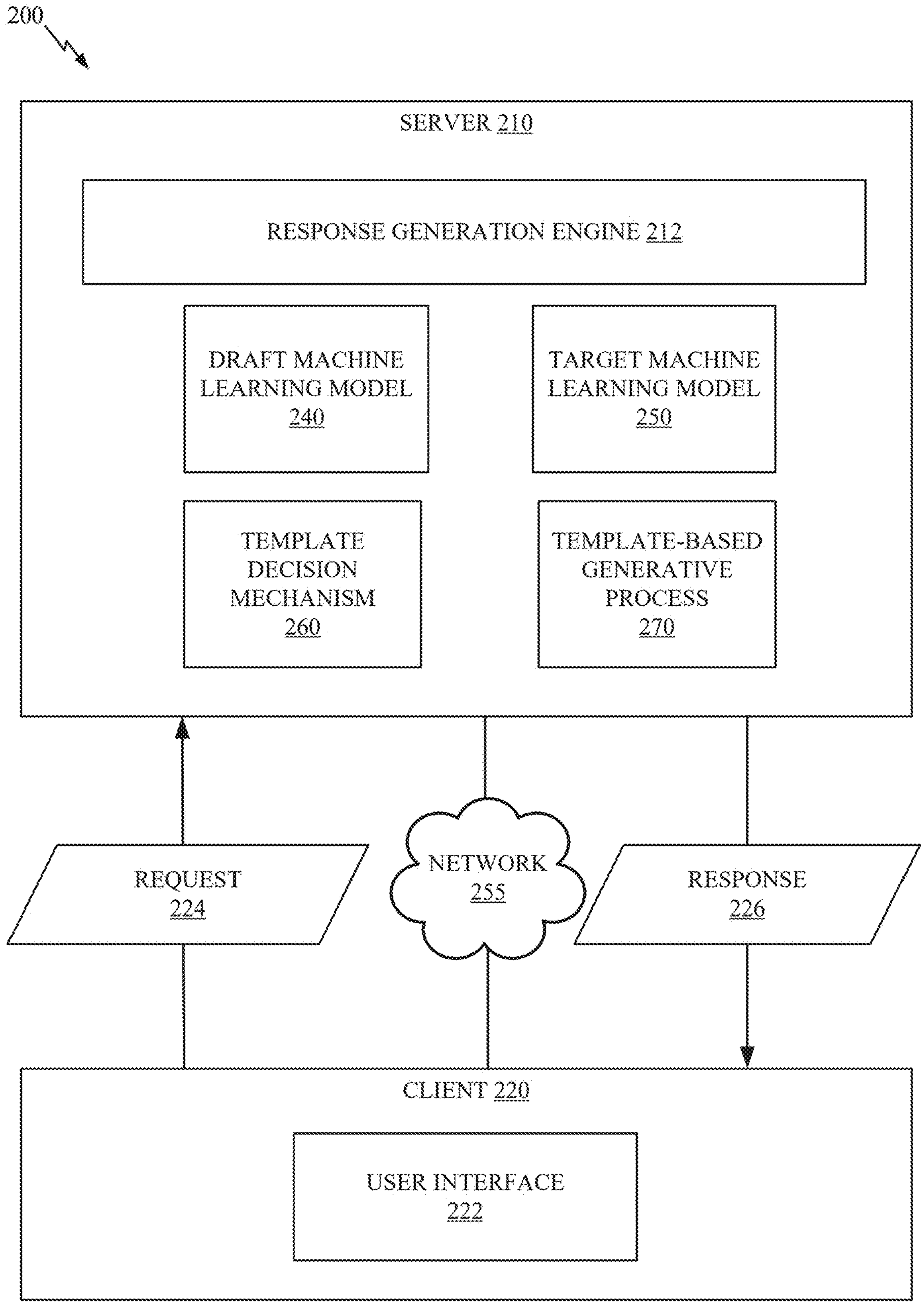
FIG. 2 is a block diagram illustrating an example computing environment for accelerated machine learning based sequence generation, according to aspects of the present disclosure.

Example Computing Components Related to Accelerated Machine Learning Based Sequence Generation FIG. 2 illustrates a block diagram of a computing environment 200 related to accelerated machine learning based sequence generation. The computing environment 200 may include a server 210 and a client 220 connected via a network 255.

Server 210 may comprise one or more processors and a memory storing instructions. In some cases, server 210 may be an application server or other computing device that hosts a computing application accessed by one or more users, such as via user interface 222 on client 220.

The client 220 be a computing device by which a user interacts with a computing application, and may include a user interface 222 that enables such interaction. The client 220 may send a request 224 through the network 255 to the server 210, and may receive a response 226 back through the network 255 in response. For example, request 224 may be a request for information, to perform an operation, and/or the like, such as based on input provided by a user interacting with user interface 222 (e.g., providing natural language input, selecting a user interface element, and/or the like). In some aspects, request 224 is a natural language query.

Server 210 may generate response 226 (e.g., in response to request 224) through a process that involves the use of accelerated machine learning based sequence generation by response generation engine 212, using draft machine learning model 240, target machine learning model 250, template decision mechanism 260, and/or template-based generative process 270.

Response generation engine 212 may orchestrate template-guided speculative decoding to produce a sequence in response to request 224. After receipt of an input query (e.g., request 224), response generation engine 212 may determine a generation context containing the query (and any previously accepted tokens in the response so far) and may coordinate two complementary generation paths: a draft path using draft machine learning model 240 for autoregressive token production, and a template path using template-based generative process 270 to generate one or more tokens in a single operation without invoking draft machine learning model 240. Target machine learning model 250 evaluates candidates from either path and serves as the arbiter of acceptance for additions to the sequence returned as response 226.

Path selection is performed by template decision mechanism 260. In one implementation, template decision mechanism 260 comprises a lightweight binary classifier (e.g., which may be encoder-based) that consumes a representation of the current generation context and outputs a decision indicating whether the upcoming content is likely to conform to a recognizable template. Suitable classifiers for template decision mechanism 260 include transformer encoders, convolutional text encoders, recurrent encoders, and/or other types of classifier models, and such a classifier may be trained through supervised learning. Training data may be produced automatically by an offline pipeline that, for each of many corpus contexts, generates both a template continuation (e.g., using template-based generative process 270) and a draft continuation (e.g., using draft machine learning model 240), processes each continuation with target machine learning model 250 to obtain log-probabilities, and labels the corpus context with the preferred path based on relative likelihood (e.g., the label may indicate that a next portion based on the corpus context is likely to be associated with a template associated with a template if the template continuation has a higher log probability than the draft continuation), thereby avoiding manual annotation. Training of the classifier may involve providing training inputs (e.g., a corpus context) to the classifier, receiving outputs from the classifier based on the training inputs (e.g., indicating whether a next portion is likely to be associated with a template), and iteratively updating parameters of the classifier based on comparing the outputs to the labels associated with the training inputs in the training data (e.g., until outputs from the model match the labels or some other condition is detected, such as relating to model accuracy, such as based on evaluating a cost function).

In one aspect, template decision mechanism 260 comprises a compact large language model (LLM) or small language model configured (e.g., via a prompt) to output a template decision, such as in the form of a binary output, in zero-shot or few-shot modes. The compact model may, for example, be a decoder-only transformer or an encoder-decoder model that consumes a representation of generation context 302 and produces "template" or "no template" together with a confidence score (and/or in some aspects, an indication of a particular template that was detected). Few-shot operation may include in-context exemplars of prior contexts and associated decisions, enabling rapid adaptation without additional fine-tuning.

Alternatively, template decision mechanism 260 may be realized as a rules engine that evaluates patterns such as regular expressions, schema constraints, keyword cues, or code-aware heuristics to detect predictable structures.

When template decision mechanism 260 indicates that a next portion is predicted to be associated with a template, response generation engine 212 may invoke template-based generative process 270 to generate a candidate portion (e.g., including one or more tokens) in a single operation, bypassing the use of draft machine learning model 240.

Template-based generative process 270 can be rules-driven, where a registry of templates and associated application rules synthesizes the next segment (e.g., deterministically based on configured templates), or model-driven, where a specialized generative model with fewer parameters than draft machine learning model 240 produces the segment based on one or more templates (e.g., the model may have been trained based on templates and/or may be provided with one or more templates at inference time). Templates may include conversational boilerplate such as greeting and closing phrases, customer-support salutations, and enterprise disclaimers; programming scaffolding including function signatures and import blocks; structured data fragments such as JSON key sequences; and tabular layouts with repeated column headers; and/or the like. The system may register domain-specific templates and update the registry based on operational telemetry and training data evolution.

Such a registry of templates may be used by template decision mechanism 260 and/or template-based generative process 270.

Suitable models for template-based generative process 270 include compact decoder-only transformers, encoder-decoder sequence-to-sequence models, small grammatical decoders trained to output structured fragments such as function signatures, JSON fields, or table headers, and/or the like. Such a model may be trained though supervised learning and/or, in some cases, by fine-tuning on corpora enriched with template data such as boilerplate, scaffolding, and/or the like, by prompt-tuning to bias outputs toward one or more known templates, by few-shot conditioning with template data at inference time, and/or the like. The emitted segment length (e.g., the number of tokens generated in a single pass or a single generative operation) may be configured or may be chosen adaptively based on template type, acceptance history, configured bounds, and/or the like.

In a rules-based example, template-based generative process 270 generates one or more tokens for a next portion of the sequence based on a configured rule indicating what that the next one or more tokens should be in a template identified by template decision mechanism 260. In a model-based example, the current generation context (and, in some aspects, a template identified by template decision mechanism 260 or an identifier of such a template) may be provided as input(s) to a lightweight generative model, and the lightweight generative model may output the next one or more tokens based on the generation context, such as according to a template identified by template decision mechanism 260.

Each candidate segment produced by template-based generative process 270 or by draft machine learning model 240 is submitted to target machine learning model 250 for verification in a single evaluation step. Target machine learning model 250 is a higher-capacity language model, such as a transformer (e.g., which may be a decoder-only transformer) with substantially more parameters than draft machine learning model 240, trained by supervised learning for next-token prediction and optionally refined with preference optimization or reinforcement learning from human feedback. Verification may compute the likelihood of the candidate segment conditioned on the generation context and apply an acceptance criterion such as thresholded cumulative probability, constrained decoding checks, agreement with predicted next-token distributions, and/or the like.

Verification by target machine learning model 250 may include computing the cumulative log-probability of the candidate segment conditioned on the generation context and accepting when the probability exceeds a configured threshold. Additional checks may include constrained decoding consistency with schema constraints, delimiter integrity, and/or distributional agreement with predicted next-token probabilities across the segment.

If target machine learning model 250 indicates that it accepts the candidate segment, response generation engine 212 appends the segment to the sequence, updates the generation context, and re-invokes template decision mechanism 260 for the subsequent portion. If target machine learning model 250 indicates that it rejects the candidate sequence, the engine falls back to the draft path.

On the draft path (e.g., performed either if template decision mechanism 260 determines that the next portion is not predicted to correspond to a template or if target machine learning model 250 rejects a candidate segment generated by template-based generative process 270), response generation engine 212 uses draft machine learning model 240 to propose one or more next tokens (e.g., autoregressively). Draft machine learning model 240 may be a smaller (e.g., smaller than target machine learning model 250) transformer (e.g., which may be a decoder-only transformer) trained with standard language modeling objectives and optionally based on transfer learning from target machine learning model 250 to improve proposal quality. Response generation engine 212 may stream proposed tokens from draft machine learning model 240 to target machine learning model 250 for speculative verification; accepted tokens are committed, and upon a rejection event the engine either requests target machine learning model 250 to regenerate the disagreeing portion directly or resumes drafting from the last accepted position. This speculative loop may continue until either the sequence completes or template decision mechanism 260 again predicts that a template is applicable, at which point control may switch back to template-based generative process 270.

Response generation engine 212 may support batch and streaming modes with tunable parameters governing template segment length, acceptance thresholds, and switching cadence between paths. By concentrating token-level decoding on variable content with draft machine learning model 240 and substituting single-operation template generation via template-based generative process 270 for predictable content, the engine reduces forward passes, lowers latency, and decreases compute consumption while preserving output fidelity through verification by target machine learning model 250 and seamless fallback mediated by template decision mechanism 260. Example predictable segments include programming scaffolding such as Python function headers signaled by "def," repeated tabular column names, and structured data fragments such as JSON keys, though domain-specific templates may be registered and employed as operational telemetry and training data evolve.

The response generation engine 212 may return response 226 (e.g., which may be the completed sequence, including all portions accepted and/or generated by target machine learning model 250) to client 220 accordingly via network 255, such as for display via user interface 222. User feedback with respect to response 226 may be received via user interface 222, such as indicating correctness or incorrectness of response 226. Such feedback may be used to generate updated training data for one or more models, and such updated training data may be used to retrain one or more machine learning models (e.g., draft machine learning model 240, target machine learning model 250, a classifier of template decision mechanism 260, and/or a generative model of template-based generative process) for improved accuracy.

Example Detailed Workflows

Figure 3:
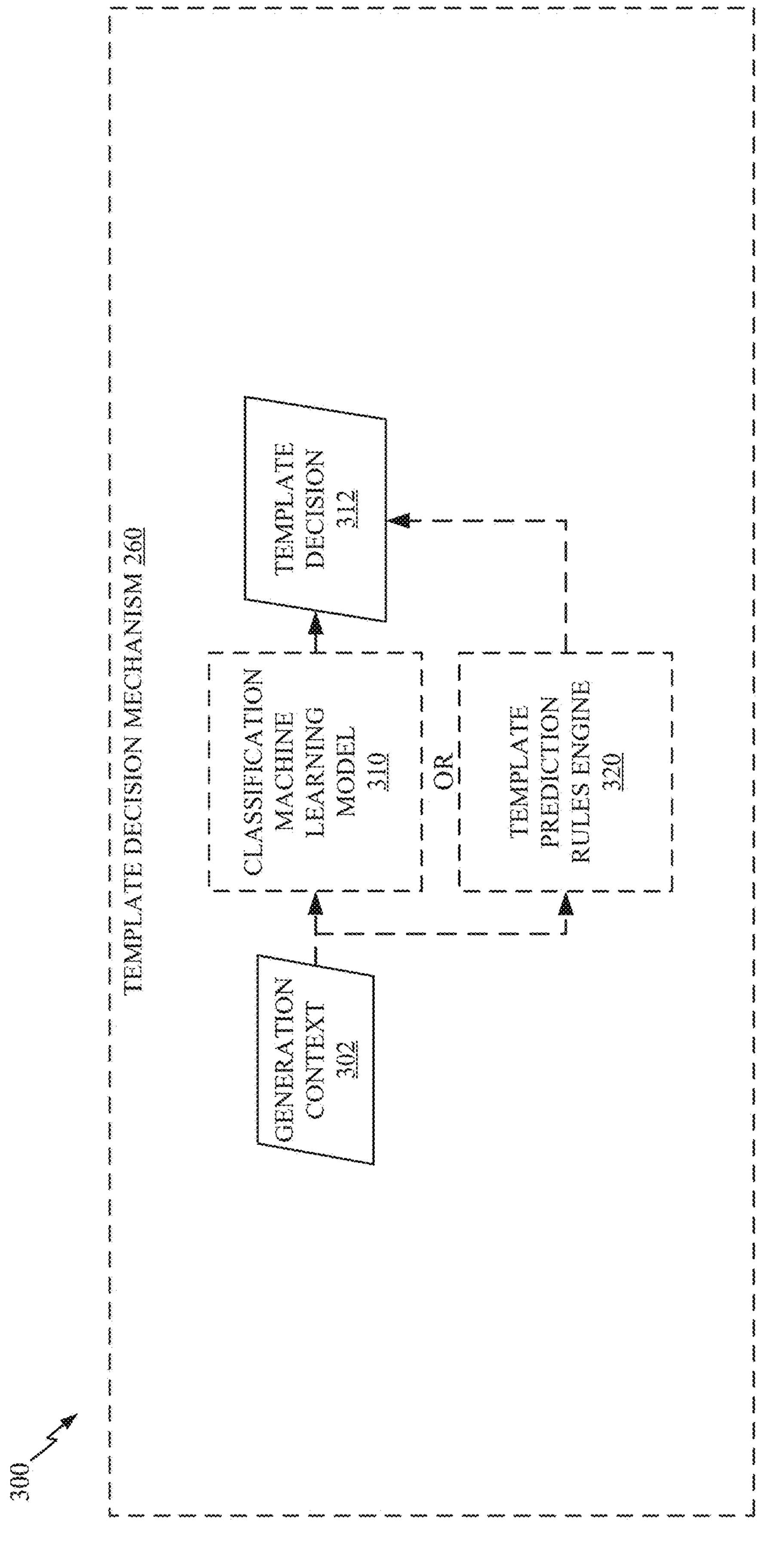
FIG. 3 is a block diagram illustrating a template decision workflow related to accelerated machine learning based sequence generation, according to aspects of the present disclosure.

FIG. 3 is a block diagram 300 illustrating an diagram illustrating a template decision workflow related to accelerated machine learning based sequence generation, according to aspects of the present disclosure.

For example, block diagram 300 depicts functionality that may be performed by template decision mechanism 260 of FIG. 2, including selecting whether upcoming content in a sequence should be generated via a template path or a draft path. A generation context 302, which includes at least the input query and any previously accepted tokens of the sequence, is provided as input to template decision mechanism 260. Within template decision mechanism 260, the generation context 302 is processed by either a classification machine learning model 310 or a template prediction rules engine 320. The classification machine learning model 310 and the template prediction rules engine 320 represent alternative realizations of the decision logic; either may be used alone, or they may be combined with priority or fallback policies, to produce a template decision 312.

In one implementation, classification machine learning model 310 is a lightweight binary classifier configured to output a decision indicating whether the next portion of the sequence is predicted to correspond to a recognizable template (e.g., the output may be template decision 312). Suitable models for classification machine learning model 310 include transformer encoders, convolutional text encoders, recurrent encoders, and/or one or more other types of machine learning models capable of consuming token embeddings and/or other features derived from generation context 302. The classifier can be trained using supervised learning on automatically labeled data produced by an offline pipeline that, for many corpus contexts, generates both template continuations and draft continuations, computes log-probabilities of each continuation under a high-capacity target model, and assigns a label indicating the preferred path. This automated labeling approach avoids manual annotation and tunes classification machine learning model 310 to the acceptance behavior of the target model used downstream.

Training data for classification machine learning model 310 may be generated at scale, such as including millions of (context, path) pairs, by an automated pipeline that produces both template and draft continuations for each corpus context, scores each continuation under target machine learning model 250 to obtain log-probabilities, and labels the preferred path without manual annotation. This approach aligns the decision mechanism with downstream acceptance behavior while avoiding costly human labeling.

In some aspects, classification machine learning model 310 may be realized by a compact language model operating in zero-shot or few-shot classification modes, provided it meets latency and resource constraints appropriate for online path selection.

Alternatively, template prediction rules engine 320 applies deterministic logic to generation context 302 to identify predictable structures. The rules may include exact and fuzzy keyword detection, regular expressions, schema constraints, code-aware heuristics, repetition detection, and/or the like to determine whether the upcoming content is likely to align with a known template family. Examples include recognizing programming language scaffolding such as function signatures, import blocks, or docstrings; identifying structured data fragments such as JSON key sequences; and detecting tabular layouts with repeated column headers. The rules engine may consult a registry mapping detected patterns to candidate template families and maintain thresholds and confidence scores that gate decisions. In certain implementations, template prediction rules engine 320 incorporates telemetry from prior decisions and/or acceptance outcomes to adapt thresholds over time.

Template prediction rules engine 320 may, for example, consult a template registry that maps detected patterns to candidate template families. The registry can return a template identifier, applicability score, suggested emission length parameters, and/or the like. Template decision 312 may carry the selected template identifier and/or parameter(s) forward so that template-based generative process 270 may be conditioned on the specified template family and/or associated constraints.

Template decision 312 is the output of template decision mechanism 260 and indicates whether to use a template-based generator or a draft machine learning model to generate the next portion of the sequence. Template decision 312 may include a binary selection and, in some aspects, an associated confidence value and/or an indication of a detected template type to facilitate template selection by downstream components. When classification machine learning model 310 is used, template decision 312 may be derived from the classifier's posterior estimate subject to configured thresholds. When template prediction rules engine 320 is used, template decision 312 reflects the evaluation of pattern matches and/or constraints within generation context 302.

Operational telemetry, including acceptance and rejection outcomes by target machine learning model 250, may be used to adapt decision thresholds and emission length settings over time. For example, the system may increase the confidence threshold for a particular template family after repeated rejections or expand the segment length for families exhibiting high acceptance rates, thereby tuning performance to deployment conditions while preserving output fidelity.

The arrangement of FIG. 3 shows context ingestion, decision computation, and decision output. By analyzing generation context 302 prior to token production, template decision mechanism 260 enables dynamic path selection that concentrates compute on variable content and substitutes single-operation template-based generation for predictable segments. Training of classification machine learning model 310 via automated labeling and refinement of template prediction rules engine 320 via operational feedback may help to align template decision 312 with downstream verification by the target model, improving throughput while preserving output fidelity.

Figure 4:
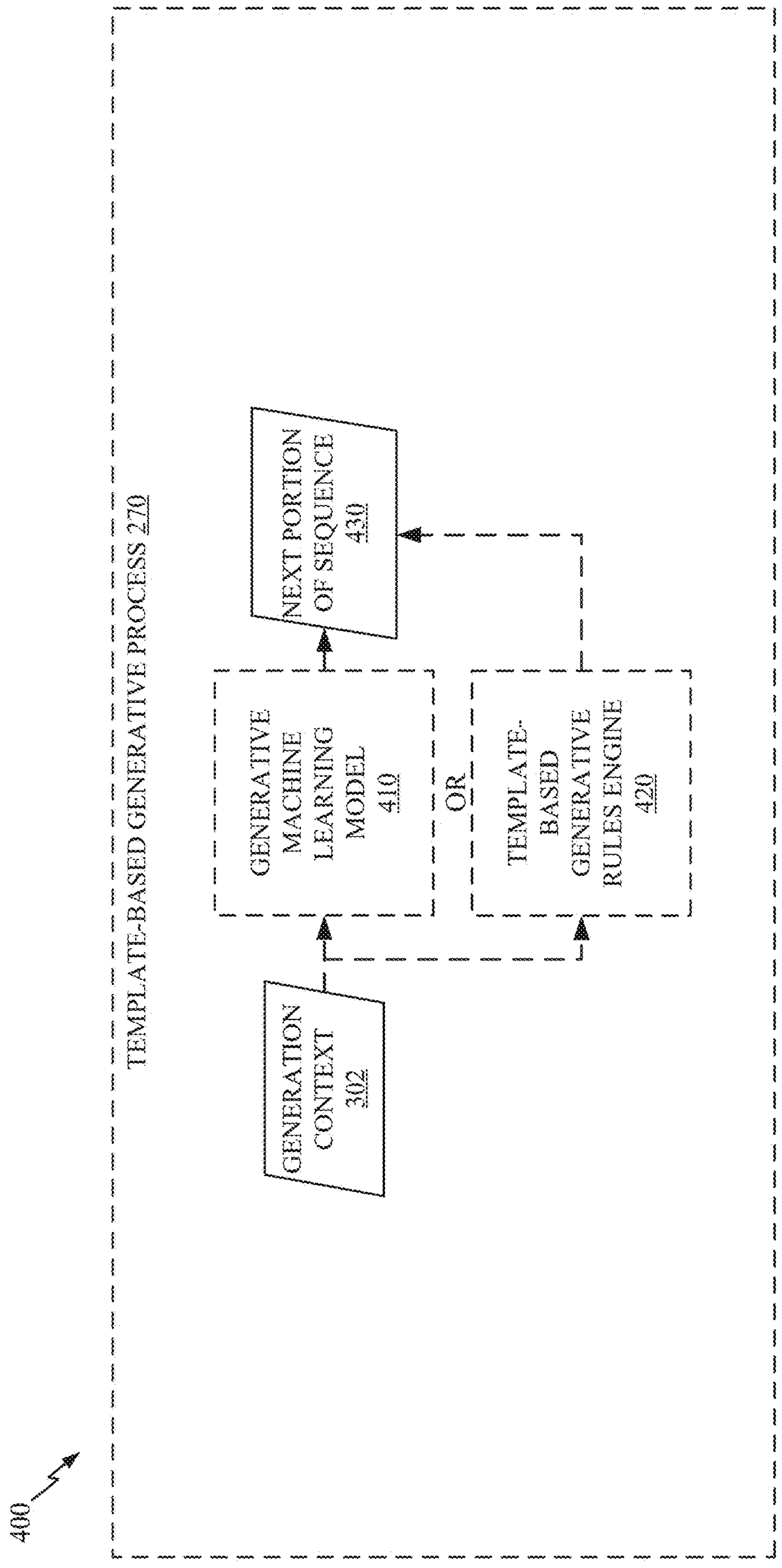
FIG. 4 is a block diagram illustrating a template-based generative workflow related to accelerated machine learning based sequence generation, according to aspects of the present disclosure.

FIG. 4 is a block diagram 400 illustrating a template-based generative workflow related to accelerated machine learning based sequence generation, according to aspects of the present disclosure. Block diagram 400 includes template-based generative process 270 of FIG. 1, and depicts functionality that may be performed by that process in some aspects.

Template-based generative process 270 may receive generation context 302 of FIG. 3, and may produce a next portion 430 of a sequence without invoking token-by-token drafting. Generation context 302 includes at least the input prompt and any previously accepted tokens in the sequence, and may optionally be accompanied by a detected template or template identifier and/or, in some aspects, one or more configuration parameters such as a target segment length.

Within template-based generative process 270, two alternative generative techniques produce one or more tokens in a single operation. In a model-driven path, a generative machine learning model 410 consumes generation context 302 (and, in some aspects, an indication of a template and/or one or more other input parameters) and outputs next portion 430. Generative machine learning model 410 may be a compact generator with fewer parameters than a draft model used elsewhere in the pipeline and may be realized, for example, as a small decoder-only transformer, an encoder-decoder sequence-to-sequence model, a grammatical decoder specialized for structured fragments, and/or the like. Generative machine learning model 410 can be trained by supervised fine-tuning on corpora enriched with template information such as boilerplate, scaffolding, schema-conforming segments, and/or the like; by prompt-tuning to bias toward one or more templates; by distillation from a larger model with curriculum emphasizing predictable structures, and/or the like. At inference time, generative machine learning model 410 may operate in zero-shot or few-shot modes conditioned on exemplars provided along with generation context 302. The emitted segment length can be fixed or adaptive based on template type, historical acceptance, configured bounds, and/or the like.

In some aspects, generative machine learning model 410 operates in few-shot mode by conditioning on exemplar fragments representative of the selected template family (e.g., function signatures, JSON key blocks, tabular headers, or the like) supplied alongside generation context 302. The exemplars bias emission toward the desired structure while preserving adaptability to local context.

Generative machine learning model 410 may be distilled from target machine learning model 250 using a curriculum emphasizing high-regularity segments (e.g., boilerplate, scaffolding, schema-conforming fragments, and/or the like). Distillation transfers target-aligned preferences into a compact generator while constraining capacity and latency budgets appropriate for single-operation template emissions.

In a rules-driven path, a template-based generative rules engine 420 takes generation context 302 and (e.g., deterministically) synthesizes next portion of sequence 430. Rules engine 420 can include a registry of templates and associated applicability predicates such as regular expressions, fuzzy keyword matches, schema constraints, code-aware heuristics, repetition detection, and/or the like. Example template families include programming scaffolding (e.g., Python function headers beginning with "def"), structured data fragments (e.g., JSON key sequences), tabular layouts with repeated column headers, and/or the like. Rules engine 420 may attach confidence scores, set emission length m for the template, and/or apply post-processing such as delimiter insertion or indentation normalization.

Next portion 430 represents a candidate segment including one or more tokens generated in a single operation by either generative machine learning model 410 or template-based generative rules engine 420. Next portion 430 may be sized to capture a coherent template unit (e.g., a header, a key block, or a function signature) and may be suitable for single-shot verification by a larger target model outside template-based generative process 270. If accepted downstream by the target model, next portion 430 is appended to the overall sequence; if rejected, control may revert to a draft path elsewhere in the system. By concentrating predictable content into single and/or lightweight generations by template-based generative process 270, techniques described herein reduce the number of forward passes and/or computing resources otherwise expended on token-level drafting while preserving output fidelity through downstream verification by the target model.

The arrangement depicted in FIG. 4 therefore encapsulates two complementary mechanisms, including generative machine learning model 410 and template-based generative rules engine 420, each consuming generation context 302 to produce next portion 430. The process may support adaptive emission length, registry-driven template selection, confidence-gated operation, and training strategies tailored to high-regularity segments, enabling efficient synthesis of predictable content prior to external acceptance checks.

Example Processing Systems

Figure 5A:
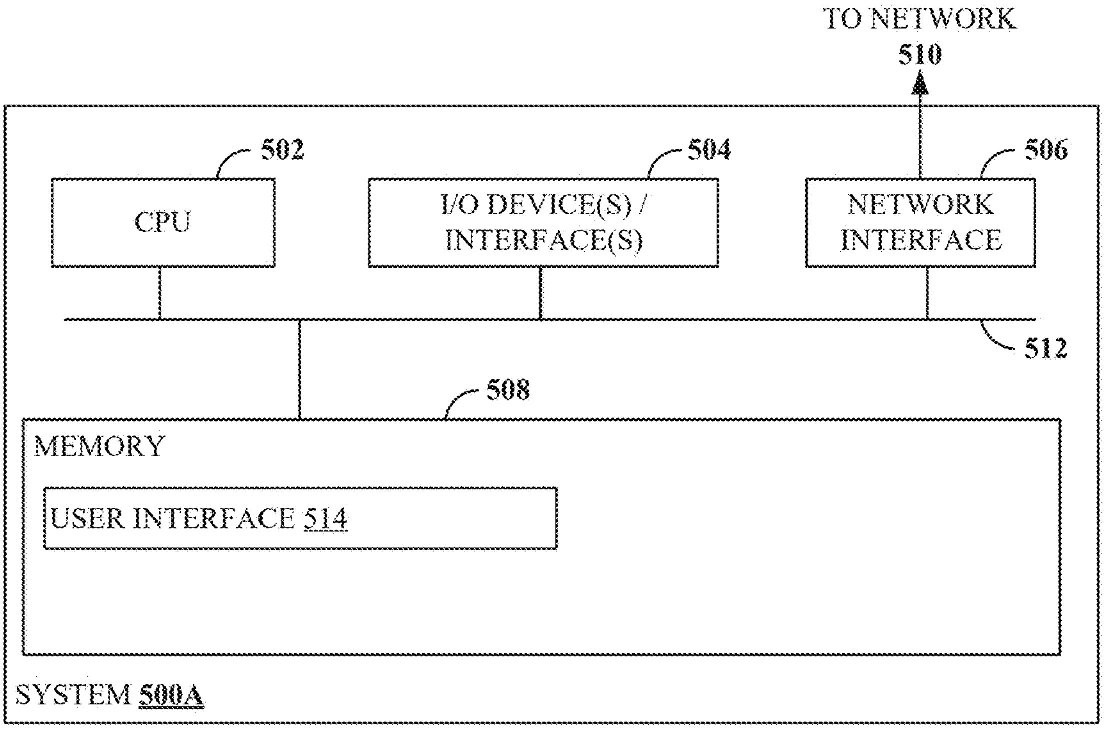
FIG. 5A and FIG. 5B illustrate block diagrams of two computing systems related to accelerated machine learning based sequence generation, according to aspects of the present disclosure.

FIG. 5A illustrates an example system 500A with which embodiments of the present disclosure may be implemented. For example, system 500A may be configured to perform aspects of functionality described above with respect to FIGS. 1-4. In one example system 500A corresponds to client 220 of FIG. 2.

System 500A includes a central processing unit (CPU) 502, one or more I/O device interfaces 504 that may allow for the connection of various I/O devices (e.g., keyboards, displays, mouse devices, pen input, etc.) to the system 500A, network interface 506, a memory 508, and an interconnect 512. It is contemplated that one or more components of system 500A may be located remotely and accessed via a network 510. It is further contemplated that one or more components of system 500A may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes a user interface 514, which may be representative of user interface 222 of FIG. 2. For example, a user may interact with user interface 514 to provide input text, submit input text, receive responses, provide feedback with respect to responses, perform other actions based on or in connection with input text and/or responses, and/or the like. For example, user feedback with respect to responses may be used to retrain one or more machine learning models through a supervised learning process for improved performance, such as one or more of machine learning models 556 of FIG. 5B.

Figure 5B:
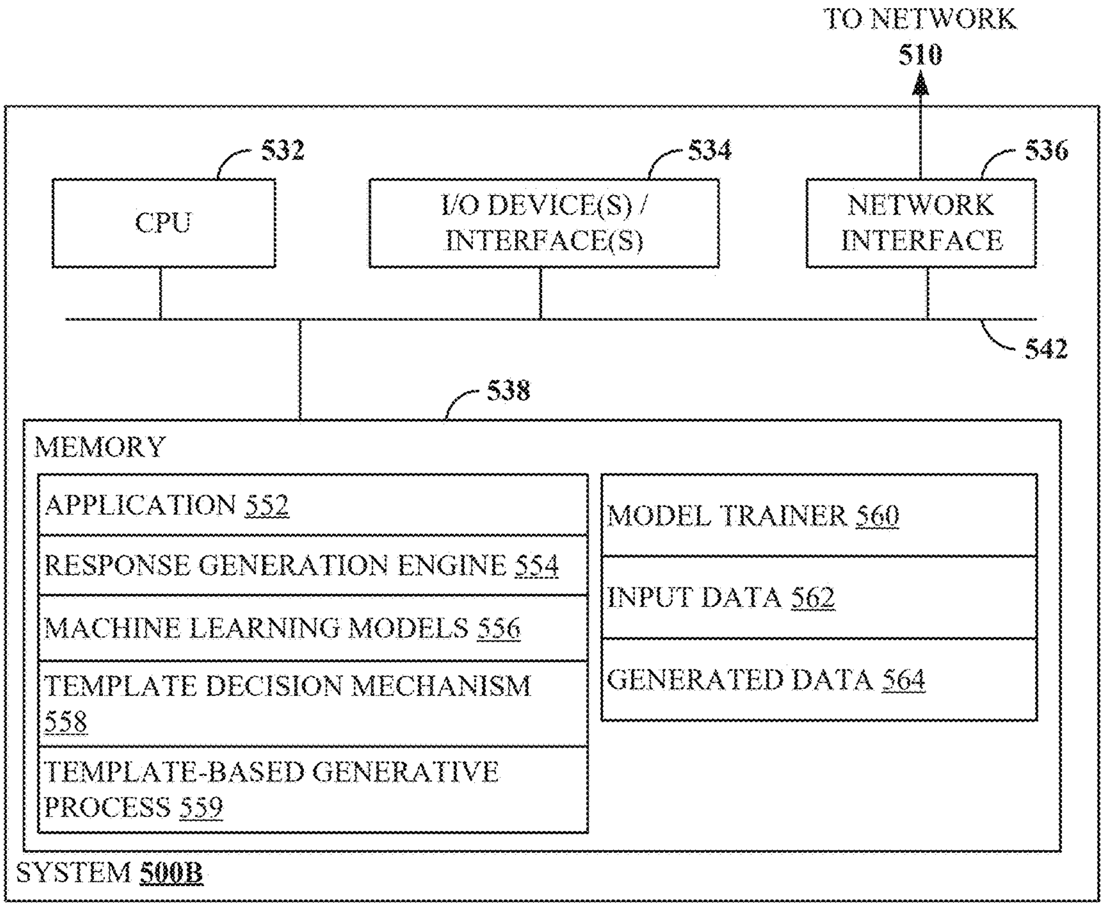

FIG. 5B illustrates another example system 500B with which embodiments of the present disclosure may be implemented. For example, system 500B may correspond to server 210 of FIG. 2.

System 500B includes a CPU 532, one or more I/O device interfaces 534 that may allow for the connection of various I/O devices (e.g., keyboards, displays, mouse devices, pen input, etc.) to the system 500B, network interface 536, a memory 538, and an interconnect 542. It is contemplated that one or more components of system 500B may be located remotely and accessed via a network 510. It is further contemplated that one or more components of system 500B may comprise physical components or virtualized components.

CPU 532 may retrieve and execute programming instructions stored in the memory 538. Similarly, the CPU 532 may retrieve and store application data residing in the memory 538. The interconnect 542 transmits programming instructions and application data, among the CPU 532, I/O device interface 534, network interface 536, and memory 538. CPU 532 is included to be representative of a single CPU, multiple CPUs, a single CPU having multiple processing cores, and other arrangements.

Additionally, the memory 538 is included to be representative of a random access memory or the like. In some embodiments, memory 538 may comprise a disk drive, solid state drive, or a collection of storage devices distributed across multiple storage systems. Although shown as a single unit, the memory 538 may be a combination of fixed and/or removable storage devices, such as fixed disc drives, removable memory cards or optical storage, network attached storage (NAS), or a storage area-network (SAN).

As shown, memory 538 includes an application 552, which may be representative of a computing application that performs language processing functionality, such as an application that includes an AI-assisted conversational system, a chat bot, or the like. In some aspects, user interface 514 of FIG. 5A provides user interface screens corresponding to application 552.

As shown, memory 538 further includes response generation engine 554, which may be representative of response generation engine 212 of FIG. 2. Memory 538 further includes machine learning models 556, which may be representative of draft machine learning model 240, target machine learning model 250, a classification model of template decision mechanism 260, and/or a generative model of template-based generative process 270 of FIG. 2. Memory 538 further includes template decision mechanism 558 and template-based generative process 559, which may be representative of template decision mechanism 260, and template-based generative process 270 of FIG. 2. In some aspects, response generation engine 554 may be part of application 552, or may be separate from application 552.

Memory 538 may further include model trainer 560, which may perform aspects related to training one or more of machine learning models 556 and/or one or more other machine learning models (e.g., an embedding model, which may also be stored in memory 538). In other aspects, model trainer 560 may be located and executed on a separate system from the system on which such machine learning model(s) are run for use in dynamic response generation.

Memory 538 may further include input data 562, which may include request 224 of FIG. 2, and/or generation context 302 of FIGS. 3 and/or 4, and/or the like. Memory 538 may further include generated data 564, which may include response 226 of FIG. 2, template decision 312 of FIG. 3, and/or next portion 430 of FIG. 4, and/or the like.

It is noted that systems 500A and 500B are included as examples, and certain functionality described with respect to systems 500A and/or 500B and/or otherwise described herein may be implemented via more or fewer devices and/or components.

Example Clauses

Clause 1: A system for accelerated machine learning based sequence generation, comprising: one or more processors; and a non-transitory computer readable medium storing instructions that, when executed by the one or more processors, cause the system to: generate a first portion of a sequence based on an input query using a speculative decoding process involving a draft machine learning model and a target machine learning model that has a larger number of parameters than the draft machine learning model; determine, by a decision mechanism operating on the input query and the first portion, that a next portion of the sequence is predicted to correspond to a template; based on the determining that the next portion is predicted to correspond to the template, generate the next portion of the sequence, without using the draft machine learning model, through a template-based generative process involving one or more rules or a generative machine learning model having fewer parameters than the draft machine learning model; verify the next portion using the target machine learning model; and append the next portion to the sequence based on the verifying.

Clause 2: The system of Clause 1, wherein the decision mechanism comprises a binary classification model configured to generate an output for use in selecting between the template-based generative process and the draft machine learning model.

Clause 3: The system of Clause 2, wherein the binary classification model has been trained using training data generated through an automated labeling pipeline that, for corpus contexts, generates template continuations and draft continuations, compares log-probabilities of the template continuations and the draft continuations generated using the target machine learning model, and generates labels for the corpus contexts based on the comparing of the log-probabilities.

Clause 4: The system of any one of Clause 1-3, wherein the template-based generative process produces a multi-token segment in a single operation, and wherein the verifying by the target machine learning model comprises a single-shot acceptance determination for the multi-token segment.

Clause 5: The system of any one of Clause 1-4, wherein the template-based generative process involves the one or more rules, and wherein the one or more rules are used to detect programming-language constructs, tabular structures, or structured data schemas in the first portion.

Clause 6: The system of any one of Clause 1-5, wherein the template-based generative process involves use of the generative machine learning model, and wherein the generative machine learning model has been fine-tuned or prompt-tuned for template generation.

Clause 7: The system of any one of Clause 1-6, wherein the determining that the next portion corresponds to the template includes matching one or more regular expressions or schema constraints against the first portion.

Clause 8: The system of any one of Clause 1-7, wherein the decision mechanism operates on a generation context comprising the input query and the first portion.

Clause 9: The system of any one of Clause 1-8, wherein rejection by the target machine learning model of a subsequent next portion generated using the template-based generative process causes the draft machine learning model to be invoked to generate the subsequent next portion.

Clause 10: The system of any one of Clause 1-9, wherein generating the next portion using the template-based generative process utilizes fewer computing resources than a single forward pass of the draft machine learning model.

Clause 11: A method for accelerated machine learning based sequence generation, comprising: generating a first portion of a sequence based on an input query using a speculative decoding process involving a draft machine learning model and a target machine learning model that has a larger number of parameters than the draft machine learning model; determining, by a decision mechanism operating on the input query and the first portion, that a next portion of the sequence is predicted to correspond to a template; based on the determining that the next portion is predicted to correspond to the template, generating the next portion of the sequence, without using the draft machine learning model, through a template-based generative process involving one or more rules or a generative machine learning model having fewer parameters than the draft machine learning model; verifying the next portion using the target machine learning model; and appending the next portion to the sequence based on the verifying.

Clause 12: The method of Clause 11, wherein the decision mechanism comprises a binary classification model configured to generate an output for use in selecting between the template-based generative process and the draft machine learning model.

Clause 13: The method of Clause 12, wherein the binary classification model has been trained using training data generated through an automated labeling pipeline that, for corpus contexts, generates template continuations and draft continuations, compares log-probabilities of the template continuations and the draft continuations generated using the target machine learning model, and generates labels for the corpus contexts based on the comparing of the log-probabilities.

Clause 14: The method of any one of Clause 11-13, wherein the template-based generative process produces a multi-token segment in a single operation, and wherein the verifying by the target machine learning model comprises a single-shot acceptance determination for the multi-token segment.

Clause 15: The method of any one of Clause 11-14, wherein the template-based generative process involves the one or more rules, and wherein the one or more rules are used to detect programming-language constructs, tabular structures, or structured data schemas in the first portion.

Clause 16: The method of any one of Clause 11-15, wherein the template-based generative process involves use of the generative machine learning model, and wherein the generative machine learning model has been fine-tuned or prompt-tuned for template generation.

Clause 17: The method of any one of Clause 11-16, wherein the determining that the next portion corresponds to the template includes matching one or more regular expressions or schema constraints against the first portion.

Clause 18: The method of any one of Clause 11-17, wherein the decision mechanism operates on a generation context comprising the input query and the first portion.

Clause 19: The method of any one of Clause 11-18, wherein rejection by the target machine learning model of a subsequent next portion generated using the template-based generative process causes the draft machine learning model to be invoked to generate the subsequent next portion.

Clause 20: A non-transitory computer readable medium comprising instructions that, when executed by one or more processors of a computing system, cause the computing system to: generate a first portion of a sequence based on an input query using a speculative decoding process involving a draft machine learning model and a target machine learning model that has a larger number of parameters than the draft machine learning model; determine, by a decision mechanism operating on the input query and the first portion, that a next portion of the sequence is predicted to correspond to a template; based on the determining that the next portion is predicted to correspond to the template, generate the next portion of the sequence, without using the draft machine learning model, through a template-based generative process involving one or more rules or a generative machine learning model having fewer parameters than the draft machine learning model; verify the next portion using the target machine learning model; and append the next portion to the sequence based on the verifying.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for accelerated machine learning based sequence generation, comprising:

one or more processors; and a non-transitory computer readable medium storing instructions that, when executed by the one or more processors, cause the system to:

generate a first portion of a sequence based on an input query using a speculative decoding process involving a draft machine learning model and a target machine learning model that has a larger number of parameters than the draft machine learning model;

determine, by a decision mechanism operating on the input query and the first portion, that a next portion of the sequence is predicted to correspond to a template;

based on the determining that the next portion is predicted to correspond to the template, generate the next portion of the sequence, without using the draft machine learning model, through a template-based generative process involving one or more rules or a generative machine learning model having fewer parameters than the draft machine learning model, wherein the template-based generative process produces a multi-token segment in a single operation;

verify the next portion using the target machine learning model, wherein the verifying of the next portion using the target machine learning model comprises a single-shot acceptance determination for the multi-token segment; and append the next portion to the sequence based on the verifying.

2. The system of claim 1, wherein the decision mechanism comprises a binary classification model configured to generate an output for use in selecting between the template-based generative process and the draft machine learning model.

3. The system of claim 2, wherein the binary classification model has been trained using training data generated through an automated labeling pipeline that, for corpus contexts, generates template continuations and draft continuations, compares log-probabilities of the template continuations and the draft continuations generated using the target machine learning model, and generates labels for the corpus contexts based on the comparing of the log-probabilities.

4. The system of claim 1, wherein the template-based generative process involves the one or more rules, and wherein the one or more rules are used to detect programming-language constructs, tabular structures, or structured data schemas in the first portion.

5. The system of claim 1, wherein the template-based generative process involves use of the generative machine learning model, and wherein the generative machine learning model has been fine-tuned or prompt-tuned for template generation.

6. The system of claim 1, wherein the determining that the next portion is predicted to correspond to the template includes matching one or more regular expressions or schema constraints against the first portion.

7. The system of claim 1, wherein the decision mechanism operates on a generation context comprising the input query and the first portion.

8. The system of claim 1, wherein rejection by the target machine learning model of a subsequent next portion generated using the template-based generative process causes the draft machine learning model to be invoked to generate the subsequent next portion.

9. The system of claim 1, wherein generating the next portion using the template-based generative process utilizes fewer computing resources than a single forward pass of the draft machine learning model.

10. A method for accelerated machine learning based sequence generation, comprising:

generating a first portion of a sequence based on an input query using a speculative decoding process involving a draft machine learning model and a target machine learning model that has a larger number of parameters than the draft machine learning model;

determining, by a decision mechanism operating on the input query and the first portion, that a next portion of the sequence is predicted to correspond to a template, wherein the decision mechanism comprises a binary classification model configured to generate an output for use in selecting between a template-based generative process and the draft machine learning model, and wherein the binary classification model has been trained using training data generated through an automated labeling pipeline that, for corpus contexts, generates template continuations and draft continuations, compares log-probabilities of the template continuations and the draft continuations generated using the target machine learning model, and generates labels for the corpus contexts based on the comparing of the log-probabilities;

based on the determining that the next portion is predicted to correspond to the template, generating the next portion of the sequence, without using the draft machine learning model, through the template-based generative process involving one or more rules or a generative machine learning model having fewer parameters than the draft machine learning model;

verifying the next portion using the target machine learning model; and appending the next portion to the sequence based on the verifying.

11. The method of claim 10, wherein the template-based generative process produces a multi-token segment in a single operation, and wherein the verifying by the target machine learning model comprises a single-shot acceptance determination for the multi-token segment.

12. The method of claim 10, wherein the template-based generative process involves the one or more rules, and wherein the one or more rules are used to detect programming-language constructs, tabular structures, or structured data schemas in the first portion.

13. The method of claim 10, wherein the template-based generative process involves use of the generative machine learning model, and wherein the generative machine learning model has been fine-tuned or prompt-tuned for template generation.

14. The method of claim 10, wherein the determining that the next portion is predicted to correspond to the template includes matching one or more regular expressions or schema constraints against the first portion.

15. The method of claim 10, wherein the decision mechanism operates on a generation context comprising the input query and the first portion.

16. The method of claim 10, wherein rejection by the target machine learning model of a subsequent next portion generated using the template-based generative process causes the draft machine learning model to be invoked to generate the subsequent next portion.

17. A non-transitory computer readable medium comprising instructions that, when executed by one or more processors of a computing system, cause the computing system to:

generate a first portion of a sequence based on an input query using a speculative decoding process involving a draft machine learning model and a target machine learning model that has a larger number of parameters than the draft machine learning model;

determine, by a decision mechanism operating on the input query and the first portion, that a next portion of the sequence is predicted to correspond to a template;

based on the determining that the next portion is predicted to correspond to the template, generate the next portion of the sequence, without using the draft machine learning model, through a template-based generative process involving one or more rules or a generative machine learning model having fewer parameters than the draft machine learning model, wherein the template-based generative process produces a multi-token segment in a single operation;

verify the next portion using the target machine learning model, wherein the verifying of the next portion using the target machine learning model comprises a single-shot acceptance determination for the multi-token segment; and append the next portion to the sequence based on the verifying.

* * * * *